O. & C. WASTE.
Machine for Preparing Hay for Baling.
No. 45,285. Patented Nov. 29, 1864.
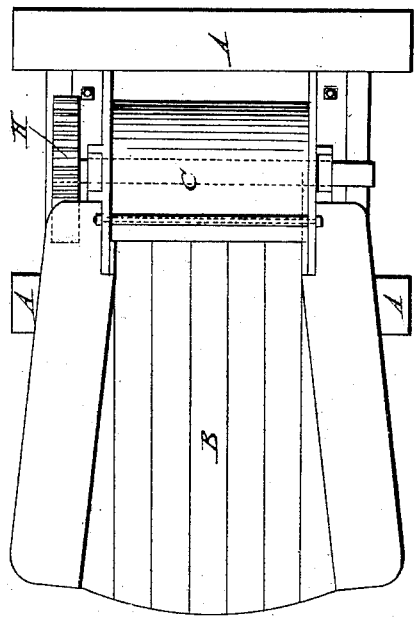
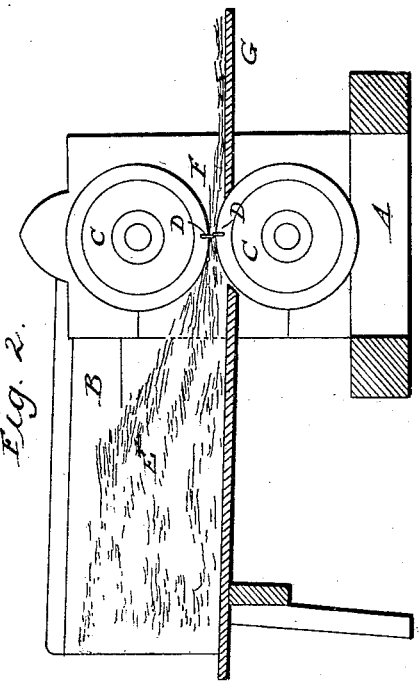
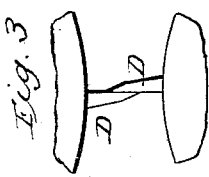
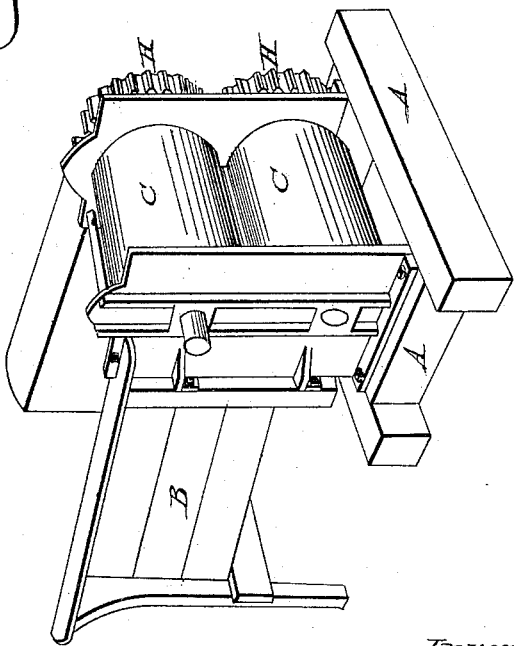

UNITED STATES PATENT OFFICE.

ORSON WASTE AND CHARLES WASTE, OF CAMERON, ILLINOIS.

MACHINE FOR PREPARING HAY FOR PRESSING INTO BALES.

Specification forming part of Letters Patent No. 45,285, dated November 29, 1864.

*To all whom it may concern:*

Be it known that we, ORSON WASTE and CHARLES WASTE, of Cameron, Warren county, State of Illinois, have invented a new and useful Improvement for Preparing Hay for Pressing into Bales; and we do hereby declare that the following is a full and exact description thereof, reference being had to the accompanying drawings, and to the letters of reference marked thereon.

The object to be obtained in pressing hay is to secure as much as possible within a given space, thereby saving in transportation, and also saving in storage.

The object and nature of this invention is to accomplish this purpose by crushing or pressing and cutting the hay into sheets of the required length and width before they are finally pressed into bales.

Figure 1 represents a top view of the machine used for crushing and cutting the hay into sheets. Fig. 2 is a vertical section of the same machine, showing the action of the rollers, the office of the knives, and the hay passing between the rollers. Fig. 3 is a section of the rollers, showing the action of the knives on a larger scale. Fig. 4 is a front perspective view of the rollers.

Similar letters of reference in the different figures refer to similar parts.

A, Fig. 1, is the frame which supports the rollers and all the machinery necessary for driving them.

B is the feed-box, in which is placed the hay in bulk previous to its passing through between the rollers.

C C are the rollers, located one above the other.

D D are knives firmly placed in the rollers and so located with reference to each other that they will at each revolution of the rollers pass each other, as shown in Fig. 3.

E is the hay as it is placed in the feed-box.

F is the same hay after it has passed through between the rollers, crushed, pressed, and cut into a sheet.

G is the table which receives the sheet of hay from the rollers.

H H are the cog-wheels meshing into each and thus driving the rollers C C in opposite directions. Motion is communicated to these wheels and thence to the rollers by any suitable means, and may be steam or horse power. The rollers C C are located at a proper distance apart to answer the desired purpose.

As the rollers C C revolve the hay E passes in between the rollers, and the rollers being located sufficiently near each other, all the hay thus passing through is crushed or pressed into sheets F. Every tube and stem passing is crushed and the hollow spaces in the interior of the stems or tubes are closed and the elasticity of the hay is destroyed, and it is reduced to nearly a solid form. As the rollers C C revolve, the knives D D passing each other, as shown at D D, Fig. 3, the pressed or crushed hay is cut into sheets and delivered onto the receiving-table G. The lengths of the sheets depend upon the circumference of the rollers, as a sheet is cut at every revolution of the rollers. The sheet F is then placed into a press-box of the ordinary size and form, and when a proper number are placed into the press-box they are pressed into bales and bound ready for transportation.

It has been found by experience that the method herein described of treating hay by crushing or pressing and cutting it into sheets previous to its being placed into the press-box enables the operator to make a more compact bale, as it is more solid, and hence a great saving is made in transportation and in storage, by lessening the bulk.

Having thus described our invention, what we claim as new, and desire to secure by Letters Patent, is—

The rollers C C and knives D D, when constructed and arranged as and for the purpose specified.

ORSON WASTE.
CHAS. WASTE.

Witnesses:
E. W. ROWE,
T. W. BONE.